United States Patent [19]
Muhlfelder

[11] 4,084,772
[45] Apr. 18, 1978

[54] ROLL/YAW BODY STEERING FOR MOMENTUM BIASED SPACECRAFT

[75] Inventor: Ludwig Muhlfelder, Livingston, N.J.

[73] Assignee: RCA Corporation, New York, N.Y.

[21] Appl. No.: 653,014

[22] Filed: Jan. 28, 1976

[51] Int. Cl.² .............................................. B64G 1/10
[52] U.S. Cl. .................................... 244/165; 244/166; 244/169
[58] Field of Search ........................ 235/150.2, 150.25; 244/3.2, 3.4, 3.23, 164–166, 169

[56] References Cited

U.S. PATENT DOCUMENTS

| | | | |
|---|---|---|---|
| 2,973,162 | 2/1961 | Haeussermann | 244/165 |
| 3,429,524 | 2/1969 | Buckingham et al. | 244/166 |
| 3,591,108 | 7/1971 | Perkel et al. | 244/165 |
| 3,940,096 | 2/1976 | Keigler et al. | 244/165 |

Primary Examiner—Stephen G. Kunin

Attorney, Agent, or Firm—H. Christoffersen; Joseph D. Lazar

[57] ABSTRACT

Roll and yaw attitude errors introduced by orbit inclination deviations from the nominal orbit plane are minimized by sinusoidally varying the momentum produced by a transverse wheel mounted on the spacecraft. The wheel is mounted on the spacecraft such that its axis is parallel to the spacecraft's yaw axis. Sinusoidal variation of wheel momentum is obtained by sinusoidally varying wheel speed in response to a sine wave signal periodically updated from an earth station. In response to the sinusoidal variation of transverse wheel momentum, the spacecraft is rolled to minimize thereby the roll error introduced by the orbit deviation from the nominal orbit plane. Yaw error is minimized by providing sufficient transverse wheel momentum so as to maintain the total spacecraft momentum vector perpendicular to the nominal orbit plane.

7 Claims, 5 Drawing Figures

ROLL/YAW BODY STEERING FOR MOMENTUM BIASED SPACECRAFT

BACKGROUND OF THE INVENTION

1. Field of the Invention

This invention relates to attitude control for pitch momentum biased satellites and more particularly to control of the roll and yaw errors introduced by orbit inclination deviations from the nominal orbit plane.

2. Description of the Prior Art

Earth satellites now in use for the relaying of telecommunications between widely separated earth stations are placed in circular equatorial orbits at an altitude such that the period of revolution is equal to the period of rotation of the earth. Thus, in principle, the satellite remains at a fixed point in the sky as seen by an observer on the surface of the earth. It is thus ideally geo-stationary. It may also be said to be in a synchronous equatorial orbit. The satellite is, however, subject to the perturbing effects of the sun and moon and of the oblate earth. These perturbing effects manifest themselves in changes in the shape or orientation of the satellite orbit and also in the changes in the position of the satellite along the orbit. The slow drift of the satellite along its orbit (east-west drift) can be due to deviations from the nominal radius of the orbit and can be corrected by relatively small expenditures of propellant fuel by thrusters on board the satellite. Changes in the orientation of the satellite orbit (north-south drift) results in a satellite orbit which deviates from the nominal orbit inclination. As a result of this deviation, roll and yaw pointing errors are introduced. The inclination of the orbit changes with time and can be maintained near zero by the expenditure of considerably more propellant fuel than is required to compensate for east-west drift. For a satellite lifetime of a number of years, the mass of the propellant required for north-south station keeping can become a very substantial fraction of the total mass of the spacecraft. An extended analysis of the perturbation of the orbit of earth satellites has been described in a publication by the Rand Corporation Santa Monica, California by R. H. Frick, entitled "Orbital Regression of Synchronous Satellites Due to the Combined Gravitational Effects of the Sun, the Moon, and the Oblate Earth." (Report R-454-NASA, August, 1967). Accordingly, a system for directly compensating for the roll and yaw pointing errors introduced by the deviations from the nominal orbit inclination is needed in order to avoid the necessity of requiring the spacecraft to carry a large dedicated mass of the propellant for this particular purpose.

SUMMARY OF THE INVENTION

According to the present invention, a spacecraft attitude control system includes a transverse momentum wheel which is energized so as to effect the necessary sinusoidal variation in transverse momentum to minimize and therefore compensate for roll and yaw pointing errors introduced by orbit inclination deviations from the nominal orbit plane. The momentum wheel is oriented in the spacecraft along an axis parallel to the spacecraft's yaw axis. Command update signals which represent the peak amplitude and phase relationship of the sinusoidal momentum variation are periodically transmitted to the spacecraft from an earth station. These signals are received and processed by receiver means. Sinusoidal variation of transverse wheel speed in accordance with the processed signals generates the required momentum variation. The variation in momentum induces a roll steering angle to minimize the roll error whereas yaw error is minimized by developing sufficient transverse momentum to insure the perpendicularity of the spacecraft's total momentum vector to the nominal orbit plane. A closed loop roll control system utilizing either magnetic and/or propulsive torquing corrects for spacecraft roll error due to disturbances. Means are also provided in order to prevent the closed loop system from correcting for the purposely induced roll steering angle.

DESCRIPTION OF THE PREFERRED EMBODIMENT

Before proceeding to a description of the method and system of the preferred embodiment of the invention, a description of a conventional pitch momentum biased satellite and its associated coordinates will be given.

Figure 1A:
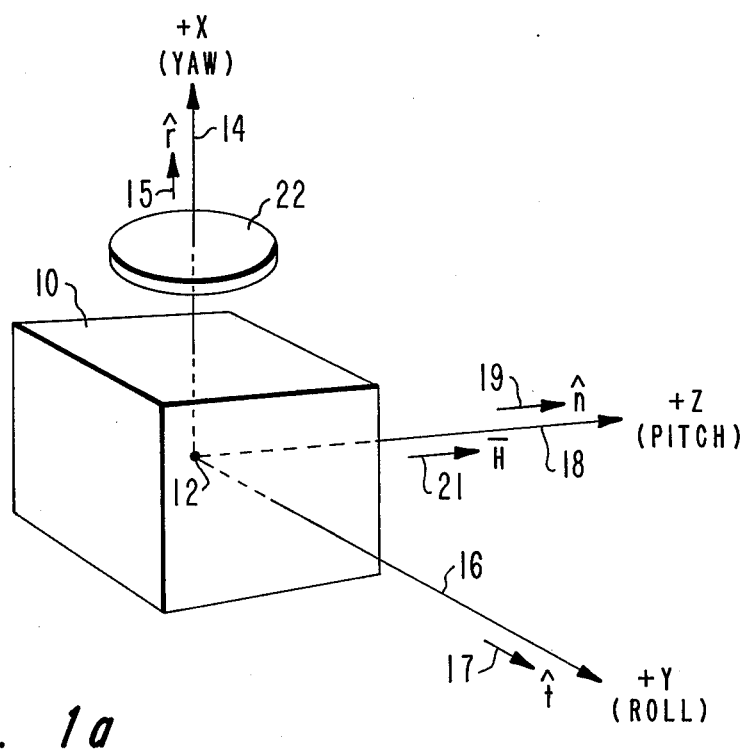
FIG. 1a is a schematic diagram of a satellite showing the three axes thereof and the transverse yaw axis reaction wheel as related to the momentum vector.

Referring to FIG. 1a, there is shown a body 10 which may be a satellite or spacecraft of any suitable or desired shape. Extending from the center of mass 12 of the spacecraft are three mutually perpendicular body axes, X, Y, and Z designated as 14, 16, 18 corresponding to the conventionally designated yaw, roll, and pitch axes, respectively. Also shown are three local orbital reference unit vectors $\hat{r}$, $\hat{t}$, and $\hat{n}$ designated as 15, 17, 19. Each unit vector is aligned with one of the spacecraft's three body axes when the spacecraft is in its nominal orientation relative to its orbit, where $\hat{r}$ 15 is the unit vector aligned with the nominal yaw axis 14, $\hat{t}$ 17 is the unit vector aligned with the nominal roll axis 16, and $\hat{n}$ 19 is a unit vector along the positive orbit normal, aligned with the pitch axis 18.

The pitch (Z) axis 18 is defined to be that direction in the spacecraft 10 collinear with the total angular momentum vector $\overline{H}$ designated as 21 and the normal to the orbit plane when the spacecraft 10 is operating in its intended mission orientation. The pitch axis 18 is parallel to the axis about which a momentum wheel (not shown) is rotated. This pitch axis momentum wheel contains substantially all of the spacecraft's momentum. The sign convention is that the pitch axis 18, shown in FIG. 1a, is positive and is in the direction of the positive angular momentum vector 21. Thus, according to the usual convention in this art, the angular momentum possessed by the spacecraft 10 is equivalent to having the body 10 spinning counter clockwise about the pitch axis. The yaw and roll axes 14, 16 are mutually perpendicular and orthogonal to the pitch axis. The axis system as defined and used herein according to the usual convention is right handed in the order X-Y-Z. The Z axis 18 shall at all times be referred to herein as the pitch or spin axis. The Z axis is parallel to the axis of the spinning (momentum) wheel (not shown).

For the purposes of describing one embodiment of the present invention, the momentum vector $\overline{H}$ is assumed to be collinear with the pitch axis 18. Further the pitch axis is normal to the plane of the orbit of the satellite.

Figure 1B:
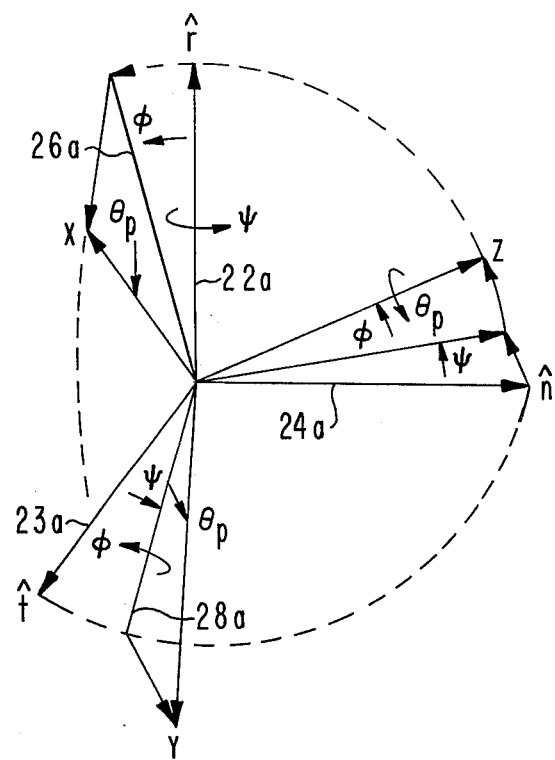
FIG. 1b is a diagram showing the axes in inertial conventions related to the orbit normal.

Referring now to FIG. 1b there is shown a diagram of several of the parameters that will be used in the description to follow of one form of the invention. The X, Y, and Z axes described above with respect to FIG. 1a are shown in their relative positions in FIG. 1b, it being understood that these axes are identical to the axes heretofore described. The local vertical vector or direction 22a is collinear with the desired reference direction for orienting the spacecraft yaw axis (14). The vector 24a indicates the direction perpendicular to the orbit plane of the spacecraft. The line 26a represents the position of the yaw axis if the spacecraft were to have a yaw angle $\psi$ (psi) and a roll angle $\phi$ (phi) but no pitch angle $\theta_p$ (theta) relative to the orbital coordinates 22a, 24a, and 23a. The line 28a similarly represents the position of the roll axis, with a yaw angle $\psi$ and a roll angle $\phi$ but no pitch angle $\theta_p$. The angles as shown by the several vectors and directions are defined as follows.

$\theta_p$ is the spacecraft pitch error, defined as the angle between the yaw axis and the plane formed by the pitch axis and the local vertical 22a;

$\phi$ is the spacecraft roll angle defined as the angle between the pitch axis and the plane formed by the orbit normal 24a and velocity vector 23a;

$\psi$ is the spacecraft yaw angle defined as the angle between the orbit normal 24a and the plane defined by the pitch axis 18, and the local vertical 22a.

The practice of this invention depends on the property of a momentum biased satellite which is essentially a gyroscope. One property of a gyroscopically stabilized spacecraft is that the direction of its momentum vector in inertial space cannot move unless deliberately torqued.

Since roll and yaw interchange sinusoidally throughout the orbit for such a gyroscopically oriented spacecraft, the position of the momentum axis is uniquely determined without the necessity of direct yaw measurement, which is most difficult for an earth oriented spacecraft.

According to the present invention a transverse wheel 22 is mounted on the spacecraft in such a manner that its spin axis is parallel to yaw axis 14. This transverse wheel driven by suitable electronics shown in FIG. 4 to be described later and bi-directional motor drives (not shown), develops sufficient angular momentum to compensate for roll and yaw pointing errors introduced by orbit inclination deviations from the nominal orbit plane. Deviation of the satellite from the nominal orbit plane is a result of the perturbing effects of the sun and moon and of the oblate earth.

Figure 2:
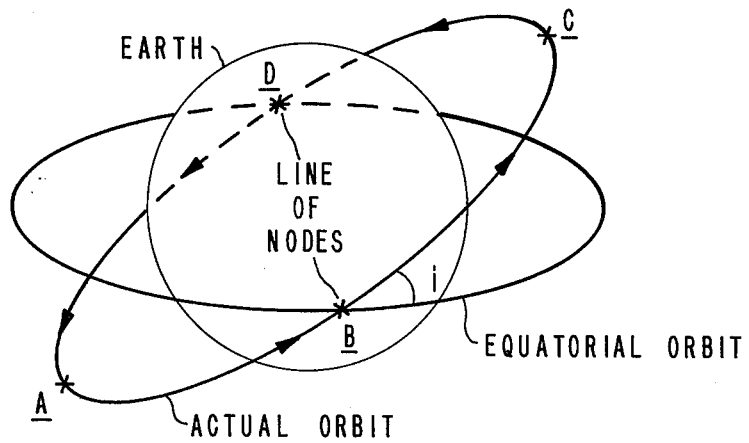
FIG. 2 is a diagram showing the inclined actual orbit and the nominal orbit.

Referring to FIG. 2, there is shown the actual orbit of an earth pointing pitch momentum biased satellite. For purposes of simplicity, the satellite itself has not been shown. The actual orbit which is the result of the perturbing effects of the sun and moon and the oblate earth is inclined at the angle $i$ with respect to an equatorial orbit which, for a synchronous altitude spacecraft, is the nominal orbit plane. The points of intersection of the actual orbit and equatorial planes are commonly referred to as the line of nodes and are designated as B and D in FIG. 2. B is also referred to as the ascending node as it is the node through which the satellite passes as it moves to the north. Similarly, as D is the node through which the satellite passes as it moves to the south it is commonly referred to as the descending node. The points designated as A and C are respectively $-90°$ and $+90°$ from the ascending node.

As a result of the inclination of the actual orbit from the equatorial orbit, roll and yaw pointing errors are introduced in the satellite. For a synchronous altitude spacecraft, the maximum roll and yaw attitude pointing errors so introduced can be determined from the following relationships:

roll pointing error max $(\phi_i) = 0.178 \times x$ (degrees)     (1)

yaw point error max $= i$ (degrees)     (2)

where $i$ is the orbit inclination in degrees.

The maximum yaw pointing error due to the inclination deviation from the equatorial orbit occurs at the nodes (points B and D). The maximum roll pointing error introduced as a result of the orbit inclination deviation occurs at 90° (points A and C) from the nodes. At the nodes, the orbit inclination deviation from the equatorial orbit effects only the yaw pointing error whereas at 90° from the nodes, the orbit inclination effects only the roll pointing error. The roll and yaw pointing errors sinusoidally interchange at the orbital frequency, which for a spacecraft in a synchronous altitude orbit, is one day. Thus, for such a spacecraft, these pointing errors interchange twice per day.

Figure 3:
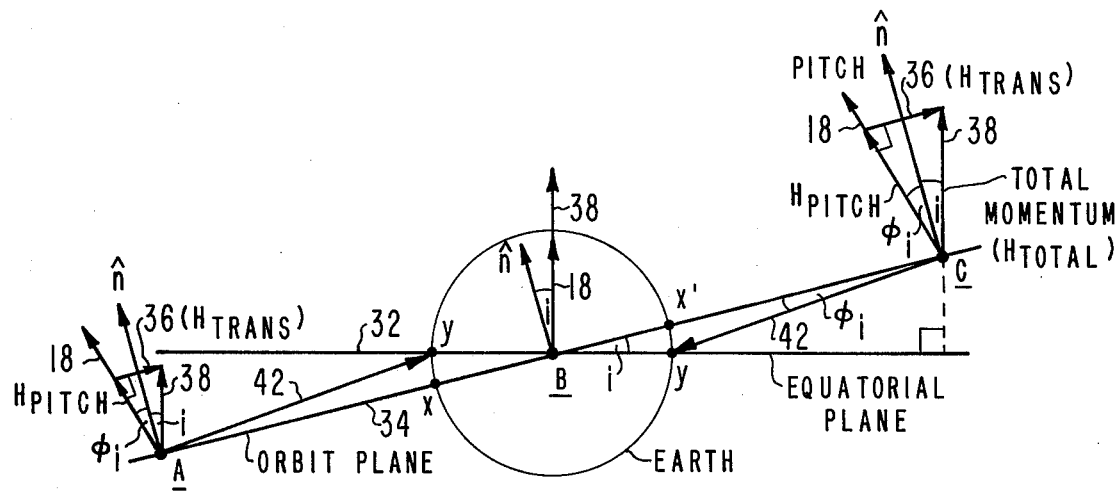
FIG. 3 is a diagram showing the vector relationships between the satellite and the non-nominal and nominal orbit planes.

The diagram illustrated in FIG. 3 shows the vector relationship between the satellite and the non-nominal and nominal orbit planes. The equatorial plane and the actual orbit plane are represented by the straight lines designated by 32 and 34, respectively. As in FIG. 2, B represents the ascending node, A and C represent, respectively, the points which are $-90°$ and $+90°$ from the ascending node, and the actual orbit plane 34 is inclined at the angle $i$ with respect to the equatorial (nominal orbit) plane 32.

For a synchronous altitude spacecraft initially placed in an equatorial orbit, the inclination deviation (north-south drift) as represented by angle $i$ increases at the approximate rate of 0.85° per year. According to the present invention, the spacecraft roll pointing error introduced by this drift from the equatorial orbit 32 is controlled by a transverse wheel 22 aligned with its spin axis along the spacecraft's yaw axis 14 (FIG. 1a). The wheel is driven so as to provide a sinusoidal variation of momentum to thereby permit roll body steering of the spacecraft. Thus, in spite of the spacecraft's non-nominal orbit 34, the satellite is rolled so as to compensate for the roll pointing error introduced by the inclination deviation to thereby maintain the desired earth pointing. For a spacecraft in a synchronous altitude orbit, the sinusoidal variation in momentum produced by wheel 22 causes the spacecraft to be rolled in the north-south direction. The rolling of the spacecraft in the north-south direction causes a misalignment between the spacecraft's pitch axis and the plane formed by the orbit normal and the velocity vector. As explained above for such a spacecraft, the deviation from equatorial plane 32 is manifested as a north-south drift of the satellite. In addition to compensating for the roll pointing error introduced by the inclination deviation, the yaw axis wheel 22 must also provide sufficient momentum so as to maintain the total spacecraft momentum vector 38 perpendicular to equatorial plane 32. By so maintaining the total momentum vector 38 the inclination deviation is prevented from affecting the spacecraft's yaw pointing. Thus, transverse yaw wheel 22 provides a sinusoidal variation of momentum which is sufficient to assure proper roll body steering and momentum vector perpendicularly with respect to equatorial plane 32. This sinusoidal variation of transverse wheel momentum, $H_{TRANS}$, is phased with the orbit rate (one revolution per day for a synchronous altitude spacecraft), has an amplitude which is dependent upon the prevailing inclination deviation $i$ from the nominal orbit plane 32.

The effect of the roll and yaw pointing error, introduced as a result of the inclination deviation and the compensation provided by the transverse wheel momentum will now be described.

In the absence of any external disturbances, the spacecraft's pitch axis 18 and orbit normal $\hat{n}$ are initially aligned at A which is −90° from ascending node B as a result of the orbit plane 34 being inclined at the angle $i$ with respect to equatorial plane 32, the spacecraft points to a position on the earth designated as X. However, if the spacecraft were in a perfect equatorial orbit, the spacecraft should point to a position on the earth designated as Y as indicated by line of sight 42. The improper pointing of the spacecraft at A represents the roll pointing error which is introduced as a result of the orbit inclination deviation. At A this roll pointing error is a negative maximum designated as $-\phi_i$ for the coordinates shown in FIG. 1a. To compensate, therefore, for such a roll-pointing error it is necessary to roll the spacecraft such that the pitch axis moves off the orbit normal, $\hat{n}$, by the angle $\phi_i$. The momentum to cause the spacecraft to roll through the angle $\phi_i$ is provided by transverse wheel 22. When the pitch axis is rolled through the angle $\phi_i$ the momentum developed along the pitch axis, $H_{pitch}$, and pitch axis 18 are both rolled through the angle $\phi_i$. In the absence of any additional momentum provided by transverse wheel 22, the total momentum vector of the spacecraft would then lie along the orbit normal.

In order, however, to compensate for the yaw pointing error introduced as a result of the orbit inclination deviation, the spacecraft's total momentum vector 38 should be normal to equatorial plane 32. The angle between orbit normal $\hat{n}$ and a normal to equatorial plane 32 is the inclination deviation $i$ between the two planes. For the total momentum vector 38 to be perpendicular to equatorial plane 32 it is therefore necessary to provide additional transverse wheel momentum whose amplitude is proportional to inclination deviation $i$. The additional transverse wheel momentum provided causes the spacecraft's pitch axis to be rolled through an additional angle $i$ from its position at the angle $\phi_i$ with respect to the orbit normal. Thus, transverse wheel 22 generates momentum at A which has an amplitude proportional to $i + \phi_i$.

As a result of the transverse wheel momentum, the spacecraft's pitch axis 18 is rolled to a position which is at an angle of $i + \phi_i$ degrees with respect to the orbit normal.

As an integral part of the system, there is provided a closed loop roll control system shown in more detail in FIG. 4, to be described later. This system operates through the use of a roll sensor in combination with either magnetic and/or propulsive torquing to compensate for roll errors introduced in the spacecraft. The rotation of the spacecraft's pitch axis through the angle $\phi_i + i$ as described above, is a roll error which can be compensated for by the closed loop system. Compensation of the roll error by the closed loop system would cause a movement of the spacecraft's pitch axis in a direction opposite to that introduced by the transverse wheel momentum. If the entire roll error ($\phi_i + i$) introduced as a result of the transverse wheel momentum were compensated for by the closed loop system, the pitch axis 18 would be moved back into alignment with orbit normal $\hat{n}$. The spacecraft's total momentum vector would then not be normal to equatorial plane 32. If, however, the closed loop roll control system compensated only for the roll error introduced by the component of transverse momentum proportional to the inclination deviation $i$, the spacecraft's pitch axis would be moved to the position shown at A. At this position, the spacecraft's total momentum vector would be normal to equatorial plane 32 and the spacecraft's pitch axis would be displaced from orbit normal $\hat{n}$ by the angle $\phi_i$. This angular displacement is defined herein as the attitude "offset." The attitude offset is thus the change of the attitude of the pitch axis relative to the inclined orbit normal required to have the spacecraft point to that position on the earth it would have pointed at if it were in an equatorial orbit. Therefore, at A transverse wheel 22 has to provide momentum of amplitude proportional to $\phi_i + i$ to thereby compensate for the roll and yaw pointing errors introduced as a result of the inclination deviation.

As the spacecraft moves from A to ascending node B, the roll pointing error introduced as a result of the inclination deviation decreases sinusoidally from a negative maximum at A to zero at B. At ascending node B, the spacecraft is pointing to that position on the earth it would have pointed at if it were in an equatorial orbit. To provide compensation for the roll and yaw pointing error as the spacecraft moves from A to B, the momentum developed by transverse wheel 22 is also reduced sinusoidally from its maximum value at A to a value of zero at B. Thus, as the spacecraft moves from A to B, momentum vector 38 is maintained perpendicular to equatorial plane 32. At ascending node B with zero momentum developed by transverse wheel 22, the only spacecraft momentum is that developed by the wheel (not shown) mounted collinear with pitch axis 18. As the spacecraft's total momentum vector 38 is perpendicular to equatorial plane 32 at B, pitch axis 18 is also perpendicular to equatorial plane 32 as shown in FIG. 3. At B, the spacecraft's pitch axis 18 is therefore at the angle $i$ with respect to orbit normal $\hat{n}$. This deviation of the pitch axis from $\hat{n}$ is a yaw error which for an earth pointing spacecraft is not sensible by an earth sensor. Therefore, the yaw error at B will not be corrected for by the closed loop roll control system on board the spacecraft. It should be understood that at B, the roll pointing error which is a result of the inclination deviation is zero.

As the spacecraft moves from B to C, the roll pointing error which is zero at B increases sinusoidally to a positive maximum at C. In addition, the yaw error at B introduced as a result of the deviation of pitch axis 18 from orbit normal $n$ couples into roll sinusoidally as a result of the inertial stiffness of the earth pointing momentum biased spacecraft's momentum vector. As the yaw error couples into roll, and therefore becomes a roll error, it will be corrected for by the spacecraft's closed loop roll control system. In the absence of momentum developed by transverse wheel 22, the compensation by the closed loop roll system would cause alignment of the spacecraft's pitch axis 18 and total momentum vector 38 with orbit normal $\hat{n}$. The alignment of the spacecraft's pitch axis and total momentum vector with orbit normal $\hat{n}$ results in a pointing error as the satellite points to position X' on the earth. If the spacecraft were in an equatorial orbit, it should point to position Y as indicated by line of sight 42.

As described previously, for A the transverse wheel must then provide sufficient momentum at C to compensate for the roll and yaw pointing errors introduced as a result of the inclination deviation. The transverse wheel momentum developed when the spacecraft is at C must then be equal in magnitude to the momentum provided at A but opposite in sign as A and C are physically separated by 180°. In order to provide continuous compensation for the roll and yaw pointing errors as the spacecraft moves from B to C the momentum developed by wheel 22 must be increased sinusoidally from zero at B to a positive maximum at C.

It should be understood, that as spacecraft 10 transverses orbit plane 34, the momentum developed by wheel 22 when the spacecraft is at any point between A and B will be exactly equal in magnitude and opposite in sign to the momentum developed when the spacecraft is at the same point between B and C, point B representing the point of symmetry.

The momentum developed by the transverse wheel 22 $H_{TRANS}$ varies sinusoidally at the orbital rate and has a magnitude which is related to the inclination deviation $i$. This transverse momentum can be expressed as:

$$H_{TRANS} = K_1 i (1 + K_2) \sin \omega_0 t \qquad (3)$$

where $K_1$ is a constant of proportionality which is equal to the pitch momentum, $H_{pitch}$, for small inclination angles ($i < 0.1$ radian), $i$ is the inclination deviation in degrees, $K_2$ is a constant of proportionality and $\omega_0$ is the orbital period and $t$ is the time in hours from the ascending node. For a synchronous altitude spacecraft, the parameters $K_2$ and $\omega_0$ are given in Table 1 below:

TABLE 1

| Parameter | Value |
|---|---|
| $K_2$ | 0.178 |
| $\omega_0$ | $2\pi/24$ Hrs. |

The relationship between transverse wheel momentum and spacecraft orbital position for a synchronous altitude orbit is given in Table II below:

TABLE II

| Position of Spacecraft | Momentum of Transverse Wheel |
|---|---|
| −90° from ascending node | $K_1(-1.178i)$ |
| Ascending and descending node | 0 |
| +90° from ascending node | $K_1(1.178i)$ | where the momentum is given as positive when the vector points along the positive spacecraft yaw axis.

Figure 4:
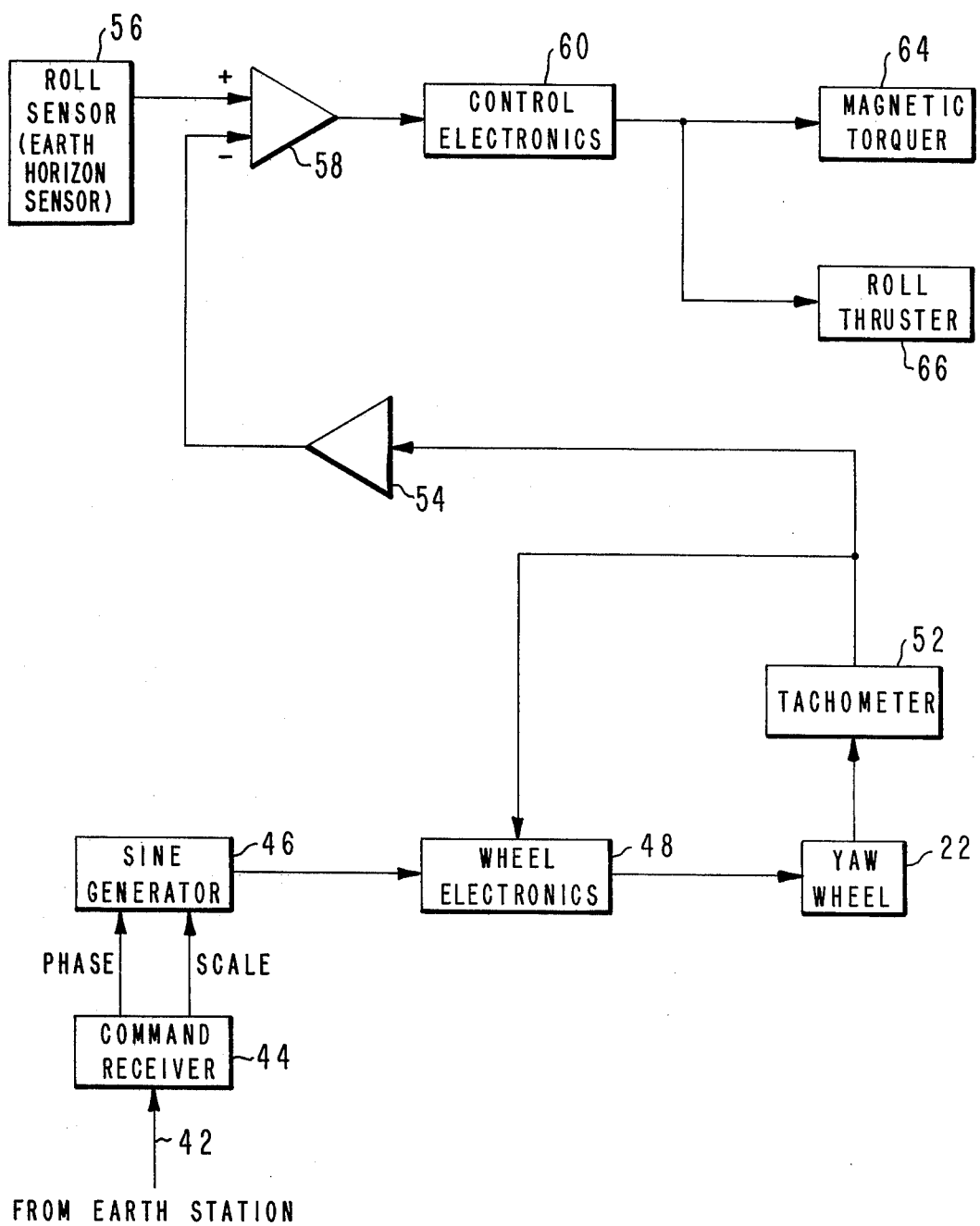
FIG. 4 is a block diagram of a control system illustrating one embodiment of the invention.

Referring to FIG. 4, there is shown a block diagram illustrating one embodiment of the invention. A command signal 42 to activate sine generator 46 and produce a sinusoidal spin rate schedule of yaw wheel 22 momentum is transmitted from an earth station, not shown, to command receiver 44. The earth station command signal 42 is a coded signal which represents both the amplitude of the sine wave to be generated and the phase relationship of the wave to the intersection of the equatorial and orbit planes B (FIG. 2). It is necessary to increase the amplitude of the sine wave generated by generator 46 on a continuous basis because, as explained previously, the orbit inclination deviation from the equatorial plane increases on a continuous basis. The rate at which the sine wave amplitude is increased is dependent upon the degree of control desired over the roll and yaw pointing errors introduced by the changing inclination. For a synchronous altitude satellite initially placed in an equatorial orbit, the amplitude of the sine wave is typically increased on a monthly basis. Command receiver 44 is any suitable prior art system which processes a received signal from an earth station and transmits the processed earth station signal to sine generator 46.

Sine generator 46 is suitably arranged to generate in response to the processed earth station signal from receiver 44 a signal determining the appropriate amplitude and phase relationship for the yaw wheel 22 spin rate schedule. Yaw wheel electronics 48 of conventional design responsive to signals from tachometer 52, and sine generator 46 generates a signal to yaw wheel 22 such that the wheel 22 generates a sinusoidal variation of momentum which as explained previously minimizes the roll and yaw pointing errors introduced as a result of the charging inclination. The momentum generated by wheel 22 is equal to the product of the wheel momentum of inertia and wheel angular velocity. As the moment of inertia is a fixed quantity dependent upon wheel design parameters, sinusoidal variation of wheel momentum is obtained by varying wheel speed in a sinusoidal fashion. Tachometer 52 of conventional design is therefore used as the indicator of wheel speed.

As explained above, yaw wheel 22 has to provide sufficient momentum for an angle between pitch axis 18 and total momentum vector 38 which assures proper roll body steering and total momentum vector 38 perpendicularity with respect to equatorial plane 32. The amplitude of the sine wave generated by generator 46 is therefore proportional to the angle between pitch axis 18 and total momentum vector 38.

As a result of the sinusoidal variation in yaw wheel momentum the spacecraft as explained above is rolled in the north-south direction, thereby minimizing the error in roll attitude pointing introduced as a result of the inclination deviation. This rolling of the spacecraft introduces a sinusoidally varying roll error which the spacecraft's roll sensor 56 detects.

Roll error may be controlled through the use of a closed loop system. Such a closed loop system for directly controlling roll error in an orbiting pitch momentum biased satellite is described in U.S. Pat. No. 3,834,653 issued Sept. 10, 1974, to RCA Corporation, based on the invention of Harold Perkel entitled "Closed Loop Roll and Yaw Control for Satellites." The system described therein achieves control by using the errors in roll as the control input parameter of the closed loop system. As described in the Perkel patent, magnetic torquer 64 oriented in the spacecraft such that it produces a magnetic dipole along the roll axis for a satellite in a synchronous low inclination orbit interacts with the primary magnetic field which is perpendicular to the orbit plane to produce a magnetic control torque about the yaw axis. Roll sensor 56, which may be an earth horizon sensor, in combination with electronic logic 60 energizes the dipole with currents of appropriate magnitude and polarity to effect the necessary torque to thereby correct the satellite's attitude. As is known in the art, the closed loop system may also utilize propulsive torquing to remove the error sensed by roll sensor 56. The propulsive torque developed by on board thruster 66 may act either alone or in combination with magnetic torquer 64 to remove the error. Where propulsive torquing is used to compensate for roll error, electronics 60 in response to roll sensor 56 would develop signals to control the duration and/or magnitude of the torque developed by thrusters 66. Thus, the purposely induced roll steering angle $\phi_i \sin \omega_0 t$ which is measured by sensor 56 as a roll error would be removed by the closed loop roll control system.

In order to prevent the closed loop roll control system from correcting for $\phi_i \sin \omega_0 t$ the purposely induced steering angle is subtracted at difference amplifier 58 from the signal generated by roll sensor 56. If the closed loop roll control system were allowed to correct for the purposely induced roll error, the compensation of roll pointing error by sinusoidally varying the momentum generated by yaw wheel 22 would be negated. Difference amplifier 58 of conventional design generates an output signal to control electronics 60 which is the difference between the signal from roll sensor 56 and the signal from tachometer 52 as modified by amplifier 54. The signal developed by tachometer 52 represents the angular velocity of yaw wheel 22 which, as explained above, is directly proportional to the sinusoidal variation of wheel momentum and roll steering angle $\phi_i \sin \omega_0 t$. Amplifier 54 of conventional design provides the gain relationship between the roll steering angle and wheel angular velocity.

It should, however, be emphasized that the inclination compensation angle $i \sin \omega_0 t$ also introduced by transverse yaw wheel 22 is not subtracted at difference amplifier 58. The angle $i \sin \omega_0 t$ which is measured by sensor 56 as a roll error is removed by the closed loop roll control system thereby resulting in the perpendicularity of the total momentum vector 38 to the nominal oribital plane. As described above, the yaw error due to the orbit inclination deviation from the nominal orbit plane is substantially eliminated by maintaining the total momentum vector perpendicular to the nominal orbit plane. If the inclination compensation angle $i \sin \omega_0 t$ developed by transverse wheel 22 were to be subtracted at difference amplifier 58 from the signal developed by sensor 56, this perpendicularity of the total momentum vector would not result.

The embodiment described provides for ground station control commands to vary the amplitude of the sine wave generated by generator 46. Such control signals may be implemented aboard the satellite in lieu of ground commands by suitable logic electronics utilizing a look-up table in which a priori data concerning the inclination orbit relation to the desired geo-synchronous orbit may be stored.

As described previously (equation 3) the amplitude of the momentum developed by transverse wheel 22 is directly proportional to the momentum contained in the wheel mounted parallel to pitch axis 18. The embodiment of FIG. 4, assumes that the pitch wheel momentum is constant. The momentum of the pitch wheel does, however, undergo small variations due to a number of external disturbances, such as, variations in solar pressure torque. To compensate for such variations in pitch wheel momentum, wheel electronics 48 can be modified to be responsive to the speed of the pitch wheel which is a direct indication of wheel momentum. What is claimed is:

1. A control system for an orbiting pitch momentum biased satellite, said satellite having a pitch, roll, and yaw axis, and wherein the momentum of said satellite is defined by a momentum vector,
    said satellite being adapted to be placed in an orbit defining a plane that is inclined relative to a plane containing a geo-synchronous orbit,
    said inclination inherently causing roll and yaw pointing errors with respect to said geo-synchronous orbit, comprising:
    a. a transverse wheel mounted parallel to said yaw axis and adapted for bi-directional rotation and varying speed,
    b. means for rotating said wheel in accordance with a predetermined rate schedule which varies sinusoidally over the orbit at the orbital frequency of the satellite whereby the attitude of said satellite is offset in response to the effect of said rotating wheel by the direction of the pitch axis being changed with respect to said momentum vector, the direction of said pitch axis with respect to the inclined orbit normal varying sinusoidally at the orbital frequency to null said roll pointing error due to said orbit inclination, the momentum vector being maintained perpendicular to the plane of the geo-synchronous orbit to null said yaw pointing error due to said orbit inclination,
    c. means responsive to said transverse wheel when rotating for generating a signal indicative of the speed and direction of said wheel,
    d. attitude sensing means for generating an attitude error signal indicative of an error in desired roll attitutde relative to said inclined orbit,
    e. means responsive to said roll attitude error signal to orient said satellite by altering the inertial direction of said momentum vector,
    f. said orientation means including means reponsive to said wheel speed and direction signal for modifying said attitude error signal to be non-responsive to said offset in attitude generated by said transverse wheel, said attitude offset being in addition to said roll attitude errors,
    said attitude offset due to said rotating transverse wheel having a predetermined relation to said inclination,
    whereby the yaw pointing errors due to said inclination are substantially reduced to zero by said momentum vector being repositioned to be perpendicular to the plane of said geo-synchronous orbit, and
    whereby the roll pointing errors due to said inclination are reduced substantially to zero by the rotation action of said transverse wheel.

2. A system according to claim 1 wherein said pointing errors are represented by the relation:
    $(i + 0.178\ i) \sin \omega_0 t$, wherein $i$ is said deviation angle, $\omega_0$ is the period of satellite's orbit, and $t$ is any time during the orbit.

3. A system according to claim 1 wherein said wheel rotation means includes means for altering said predetermined sinusoidal variation in response to ground commands.

4. A system according to claim 1 wherein said attitude sensing means includes means for sensing the horizon of the earth.

5. A system according to claim 1 wherein said orienting means comprises thrusters.

6. A system according to claim 1 wherein said orienting means comprises magnetic torquers.

7. A method for controlling the pointing of an orbiting pitch momentum biased satellite, said satellite having a pitch, roll, and yaw axis, and wherein the momentum of said satellite is defined by a momentum vector, said satellite being adapted to be placed in an orbit defining a plane that is inclined relative to a plane containing a geo-synchronous orbit, said inclination inherently causing roll and yaw pointing errors with respect to said geo-synchronous orbit, comprising:

a. rotating a transverse wheel mounted parallel to said yaw axis and adapted for bi-directional rotation and varying rate in accordance with a predetermined sinusoidal schedule over the orbit at the orbital frequency of the satellite, whereby the attitude of the satellite is offset in response to the effect of said rotating wheel by the direction of the pitch axis being changed with respect to said momentum vector, the direction of said pitch axis with respect to the inclined orbit normal varying sinusoidally at the orbital frequency to null said roll pointing error due to said orbit inclination, the momentum vector being maintained perpendicular to the plane of the geo-synchronous orbit to null said yaw pointing error due to said orbit inclination, b. generating a signal indicative of the speed and direction of said wheel, c. detecting an error in desired roll attitude relative to the inclined orbit, d. generating a signal indicative of said error in roll attitude, e. orienting said satellite in response to said roll attitude error signal by altering the inertial direction of said momentum vector, f. modifying said attitude error signal to be non-responsive to said offset in attitude generated by said transverse wheel, said roll attitude offset being in addition to said roll attitude errors, said attitude offset due to said rotating transverse wheel having a predetermined relation to said inclination, whereby the yaw pointing errors due to sain inclination are substantially reduced to zero by said momentum vector being repositioned to be perpendicular to the plane of said geo-synchronous orbit, and whereby said roll pointing errors due to said inclination are reduced substantially to zero by the rotation action of said transverse wheel.

* * * * *